Dec. 16, 1924.
G. J. SEISS
1,519,223
AUTOMOBILE HORN BRACKET
Filed Aug. 16, 1923
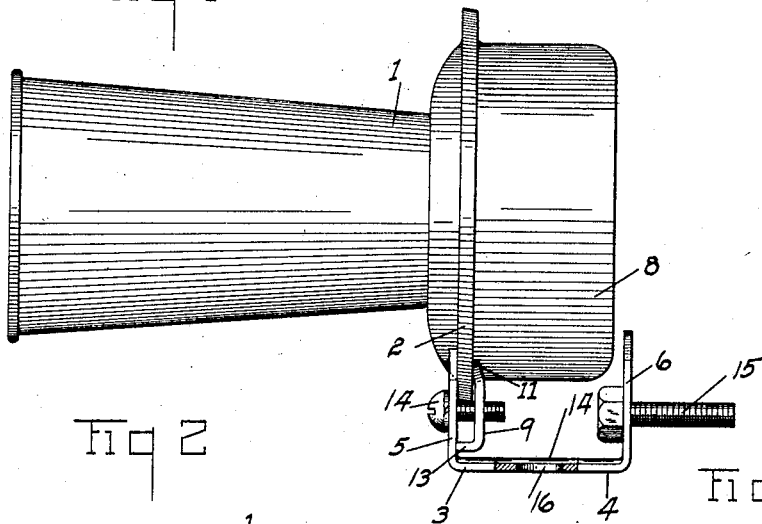
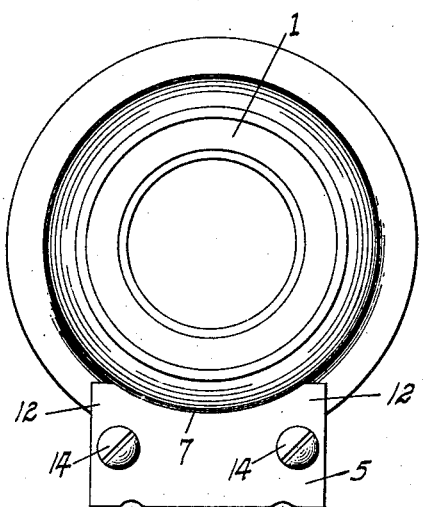
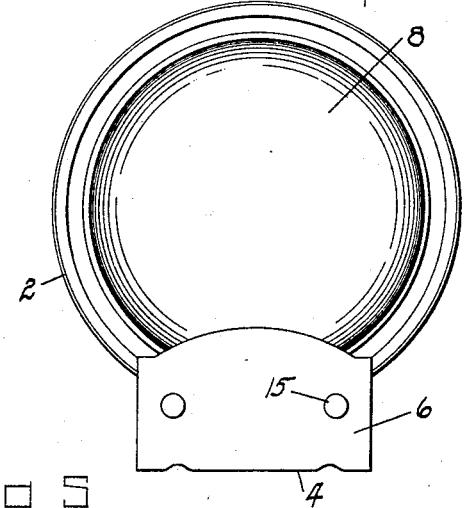
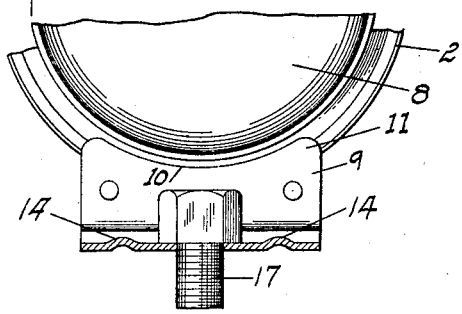
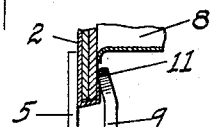
Inventor
George J. Seiss,
By Owen, Owen & Crampton
Attorney Patented Dec. 16, 1924.

1,519,223

UNITED STATES PATENT OFFICE.

GEORGE J. SEISS, OF TOLEDO, OHIO.

AUTOMOBILE HORN BRACKET.

Application filed August 16, 1923. Serial No. 657,690.

*To all whom it may concern:*

Be it known that I, GEORGE J. SEISS, a citizen of the United States, and a resident of Toledo, in the county of Lucas and State of Ohio, have made an Invention appertaining to an Automobile Horn Bracket, which invention is fully set forth in the following specification.

My invention has for its object to provide a universal bracket that is particularly adapted for supporting automobile horns in desirable places on automobiles. It particularly has for its object to provide a rigid bracket that may be connected to different parts of the automobile and to which a horn of any type may be secured by being securely clamped to the bracket and thus avoiding the use of rivets or bolts extending through the metal of the horn.

The details of the bracket may be modified and such modifications may still contain the invention. To illustrate a practical application of the invention I have selected a bracket as an example of brackets containing the invention and shall describe it hereinafter. The bracket selected is illustrated in the accompanying drawings.

Figure 1 of the drawings illustrates a side view of a horn and the bracket. Fig. 2 illustrates a front view of the bracket and of the horn. Fig. 3 illustrates a rear view of the bracket and horn. Fig. 4 illustrates a broken view, showing a means for securing the horn to the engine of an automobile. Fig. 5 is a sectional view showing in detail the clamping parts.

In Figs. 1 to 4, 1 indicates the horn, which may be of any type, that is supported by the bracket embodying my invention and which is shown in the figures. Horns are usually provided with a flanged edge 2 that surrounds the front edge of the casing that contains the sound producing elements. The bracket 3 is so constructed as to securely clamp the flange 2 and thus avoid the use of rivets and bolts that extends through the metal of the horn. The metal of the horn is usually of light material and the rivets and bolts usually tear or enlarge the openings through which they extend, which subjects the horn to a vibration that injures the somewhat delicate parts of the sound producing mechanism. The invention provides a means for securing the horn at a position that is very close to the center of gravity instead of securing it through a projection that extends from the body of the horn. The clamping part of the bracket is therefore so constructed as to conform somewhat to the shape of a portion of the flange that is clamped in securing the horn in position.

The bracket 3 is formed of a sheet metal piece 4 having upturned end portions 5 and 6. The portion 5 is cut away, as at 7, to conform to the shell 8 of the horn and in order that the front of the flange 2 may be placed in contact with the upper edge portion of the upturned end 5 over a considerable area. The clamping member 9 is located back of the flange 2 and also has an edge 10 that is cut so as to conform to the shell 8. This produces a pair of ears 11 at the corners of the clamping member 9. The ears 11 are bent forward towards the corners or ears 12 formed in the upturned portion 5 of the bracket. Commonly the flange 2 is provided with a bead-like edge. This is due to bending of the metal. In the horn shown, the edge of the front of the shell is bent over the flange and over the rear corner. The forwardly bent ears 11 extend within the bead and thus are so shaped as to securely engage the flange and the bead, and thus to rigidly connect the horn to the bracket. The lower edge portion of the clamping member 9 is bent forward, as at 13, and so as to abut against the lower part of the upturned end 5 of the bracket. The width of the forwardly turned end portion of the clamping member 9 is such as to properly position the jaw or ears 11 of the clamping member 9 with respect to the flange 2 in order that the ears 11 may properly engage the flange 2. Machine screws 14 may be threaded into the clamping member 9 to draw the clamping member toward the upturned end 5 and to thus tightly clamp the flange 2 and the horn.

The bracket 4 is provided with reinforcing ridges or channeled portions 14 that extend from one upturned end portion 5 to the other upturned end portion 6. The upturned end portion 6 may be secured by means of the bolts 15 to a dash or to any other part of the automobile, preferably a part having a substantially vertical surface. The bracket is also provided with an opening 16 that extends through the portion between the upturned ends 5 and 6. This provides a means whereby the bracket may be readily secured to a part having a horizontal surface. The hole 16 is preferably of a size such that the horn may be secured to the top of the engine, as is commonly done, by means of one of the cap bolts of the engine head, such as the bolt 17.

I claim:

1. In a bracket for an automobile horn having a flange, a clamping member formed integral with the bracket, a second clamping member coacting with the first clamping member to clamp the flange of the horn, threaded members located outside of the flange for drawing the clamping members towards each other, and means for attaching the bracket to a part of the automobile.

2. In a bracket for an automobile horn having a flange, a member having an upturned end, a clamping member having ears at its upper corners the said ears being bent towards the said upturned end, the said clamping member having a spacing flange extending towards the upturned end, screws for clamping the flange between the ears and the said upturned end and means for connecting the bracket to an automobile.

In testimony whereof, I have hereunto signed my name to this specification.

GEORGE J. SEISS.